US012013685B2

(12) United States Patent
Hayes et al.

(10) Patent No.: US 12,013,685 B2
(45) Date of Patent: Jun. 18, 2024

(54) SYSTEMS AND METHODS FOR MITIGATING CABLE TWISTS FOR UNDERWATER CLEANERS

(71) Applicant: Hayward Industries, Inc., Charlotte, NC (US)

(72) Inventors: Graham Hayes, Bermuda Run, NC (US); Patrick Caty, Lewisville, NC (US); Michael Armes, Lincoln, RI (US); Michael Padberg, West Warwick, RI (US)

(73) Assignee: Hayward Industries, Inc., Charlotte, NC (US)

( * ) Notice: Subject to any disclaimer, the term of this patent is extended or adjusted under 35 U.S.C. 154(b) by 69 days.

(21) Appl. No.: 17/514,644

(22) Filed: Oct. 29, 2021

(65) Prior Publication Data

US 2022/0137599 A1    May 5, 2022

Related U.S. Application Data

(60) Provisional application No. 63/107,364, filed on Oct. 29, 2020.

(51) Int. Cl.
*G05B 19/4155* (2006.01)
*E04H 4/16* (2006.01)
(Continued)

(52) U.S. Cl.
CPC ....... *G05B 19/4155* (2013.01); *E04H 4/1654* (2013.01); *G05D 1/0214* (2013.01);
(Continued)

(58) Field of Classification Search
CPC ............. G05B 19/4155; G05D 1/0214; G05D 1/0875; G05D 2201/02; E04H 4/1654
See application file for complete search history.

(56) References Cited

U.S. PATENT DOCUMENTS 3,078,998 A    2/1963    Blumenfeld
4,550,958 A    11/1985   Smith
(Continued)

FOREIGN PATENT DOCUMENTS

WO    98/51888 A1    11/1998
WO    00/45080 A1    8/2000
(Continued)

OTHER PUBLICATIONS

PCT International Search Report and Written Opinion of the International Searching Authority dated Feb. 3, 2022, in connection with Int'l Application No. PCT/US2021/057327 (15 pages).

*Primary Examiner* — Christian Chace
*Assistant Examiner* — Nicholas Stryker
(74) *Attorney, Agent, or Firm* — McCarter & English, LLP

(57) ABSTRACT

Systems and methods for mitigating cable twists for underwater cleaners are provided. Cable twist mitigation logic is stored in a memory associated with a pool or spa cleaner, and controls operation of the cleaner to mitigate cable twists. A sequence of cleaner orientations is retrieved from memory and compare to one or more pre-defined sequences known to contribute to cable twist. If the sequence of cleaner orientations matches the one or more pre-defined sequences, a twist angle accumulator is incremented by a pre-defined twist angle corresponding to the one or more pre-defined sequences. The system determines whether the cleaner is turning on a surface of a pool or spa, and if so, controls turning of the cleaner using an accumulated angle stored in the twist angle accumulator to mitigate cable twists. A user-definable bias value could also be applied by the system to further mitigate cable twists.

24 Claims, 4 Drawing Sheets

(51) Int. Cl.
*G05D 1/00* (2006.01)
*G05D 1/617* (2024.01)
*G05D 109/30* (2024.01)

(52) U.S. Cl.
CPC .......... *G05D 1/0875* (2013.01); *G05D 1/617* (2024.01); *G05D 2109/38* (2024.01)

(56) References Cited

U.S. PATENT DOCUMENTS

| | | |
|---|---|---|
| 4,557,535 A | 12/1985 | Keane |
| 4,837,886 A | 6/1989 | Rawlins |
| 4,894,014 A | 1/1990 | Palus et al. |
| 5,293,659 A | 3/1994 | Rief et al. |
| 6,292,970 B1 | 9/2001 | Rief et al. |
| 6,294,084 B1 | 9/2001 | Henkin et al. |
| 6,412,133 B1 | 7/2002 | Erlich et al. |
| 6,625,833 B1 | 9/2003 | Campbell et al. |
| RE38,479 E | 3/2004 | Henkin et al. |
| 7,503,809 B2 | 3/2009 | Tsai et al. |
| 7,637,744 B2 | 12/2009 | Singer |
| 7,677,268 B2 | 3/2010 | Griffin et al. |
| 7,794,254 B2 | 9/2010 | Marklove et al. |
| 7,959,454 B2 | 6/2011 | Ramasubramanian et al. |
| 8,042,622 B2 | 10/2011 | Eriksson et al. |
| 8,215,962 B1 | 7/2012 | Machado |
| 8,847,759 B2 | 9/2014 | Bisesti et al. |
| 8,986,017 B2 | 3/2015 | Borg |
| 9,300,101 B2 | 3/2016 | Hayes et al. |
| 2007/0094817 A1* | 5/2007 | Stoltz .................... E04H 4/1636 15/1.7 |
| 2008/0078039 A1* | 4/2008 | Katz ..................... E04H 4/1654 15/1.7 |
| 2008/0286986 A1 | 11/2008 | Rashkover |
| 2009/0255069 A1 | 10/2009 | Hui |
| 2009/0301522 A1 | 12/2009 | Abehasera et al. |
| 2011/0088181 A1 | 4/2011 | Rief et al. |
| 2012/0273004 A1 | 11/2012 | Erlich et al. |
| 2013/0115784 A1 | 5/2013 | Gobel et al. |
| 2013/0133144 A1* | 5/2013 | Erlich .................. E04H 4/1663 15/1.7 |
| 2014/0273541 A1 | 9/2014 | Renaud et al. |
| 2019/0035282 A1* | 1/2019 | Ferguson ........... G06Q 10/0837 |
| 2021/0265865 A1 | 8/2021 | Potucek |

FOREIGN PATENT DOCUMENTS

| | | |
|---|---|---|
| WO | 00/73691 A1 | 12/2000 |
| WO | 01/36857 A2 | 5/2001 |

* cited by examiner

US 12,013,685 B2

SYSTEMS AND METHODS FOR MITIGATING CABLE TWISTS FOR UNDERWATER CLEANERS

RELATED APPLICATIONS

The present application claims the benefit of U.S. Provisional Application Ser. No. 63/107,364 filed on Oct. 29, 2020, the entire disclosure of which is expressly incorporated herein by reference.

BACKGROUND

Technical Field

The present disclosure relates generally to the field of underwater pool and/or spa cleaning devices. More specifically, the present disclosure relates to systems and methods for mitigating cable twists for underwater cleaners.

Related Art

Underwater cleaners are devices that are commonly utilized to clean the underwater surfaces of pools and spas. One type of such underwater cleaners is the electrically-powered underwater cleaner, wherein an electrical cable (or, cord) provides electrical power to the underwater cleaner from a power source, such as an external power supply. Often, such underwater cleaners execute one or more cleaning cycles, wherein the cleaner traverses the underwater surfaces of a pool or spa in order to clean the surfaces, either randomly (e.g., the cleaner executes a cleaning program that causes the cleaner to make random turns and/or motions while cleaning surface) or in accordance with a pre-defined sequence (e.g., the cleaner executes a cleaning program that causes the cleaner to make turns and/or motions in accordance with one or more stored programs executed by the cleaner).

One common problem with electric underwater cleaners having a cable interconnecting the cleaner with a power source is that the cable can accumulate an undesirable amount of twist when the cleaner is operated, due to the path that the cleaner takes when cleaning a pool or spa. Such twist can negatively impact cleaner performance and can present a very large problem for users of such cleaners. Cable twist can be very prevalent in some pool or spa configurations and can depend on the pool or spa geometry, surface finish, and/or underwater features that the cleaner must traverse during a cleaning cycle.

Various efforts have, in the past, been attempted to mitigate cable twist in underwater pool/spa cleaners. For example, it is known to include a plurality of swivels in the cable that allow the cable to rotate at various points when the cleaner is operated, in order to mitigate twisting of the cable. However, such a solution adds significantly to product costs and manufacturing complexity, and has not been proven effective in all situations.

Accordingly, what would be desirable are systems and methods for mitigating cable twists for underwater pool/spa cleaners which address the foregoing and other needs.

SUMMARY

The present disclosure relates to systems and methods for mitigating cable twists for underwater cleaners. The system includes cable twist mitigation logic (in the form of computer-readable instructions) stored in a memory associated with a pool or spa cleaner, and which controls operation of the cleaner in order to mitigate cable twists. A sequence of cleaner orientations is retrieved from memory and compared to one or more pre-defined sequences known to contribute to cable twist. If the sequence of cleaner orientations matches the one or more pre-defined sequences, a twist angle accumulator is incremented by a pre-defined twist angle corresponding to the one or more pre-defined sequences. The system determines whether the cleaner is turning on a surface of a pool or spa, and if so, controls turning of the cleaner using an accumulated angle stored in the twist angle accumulator, in order to mitigate cable twists. A user-definable bias value could also be applied by the system, in order to further mitigate cable twists.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for mitigating cable twists for underwater cleaners, as described in detail below in connection with FIGS. 1-4.

Figure 1:
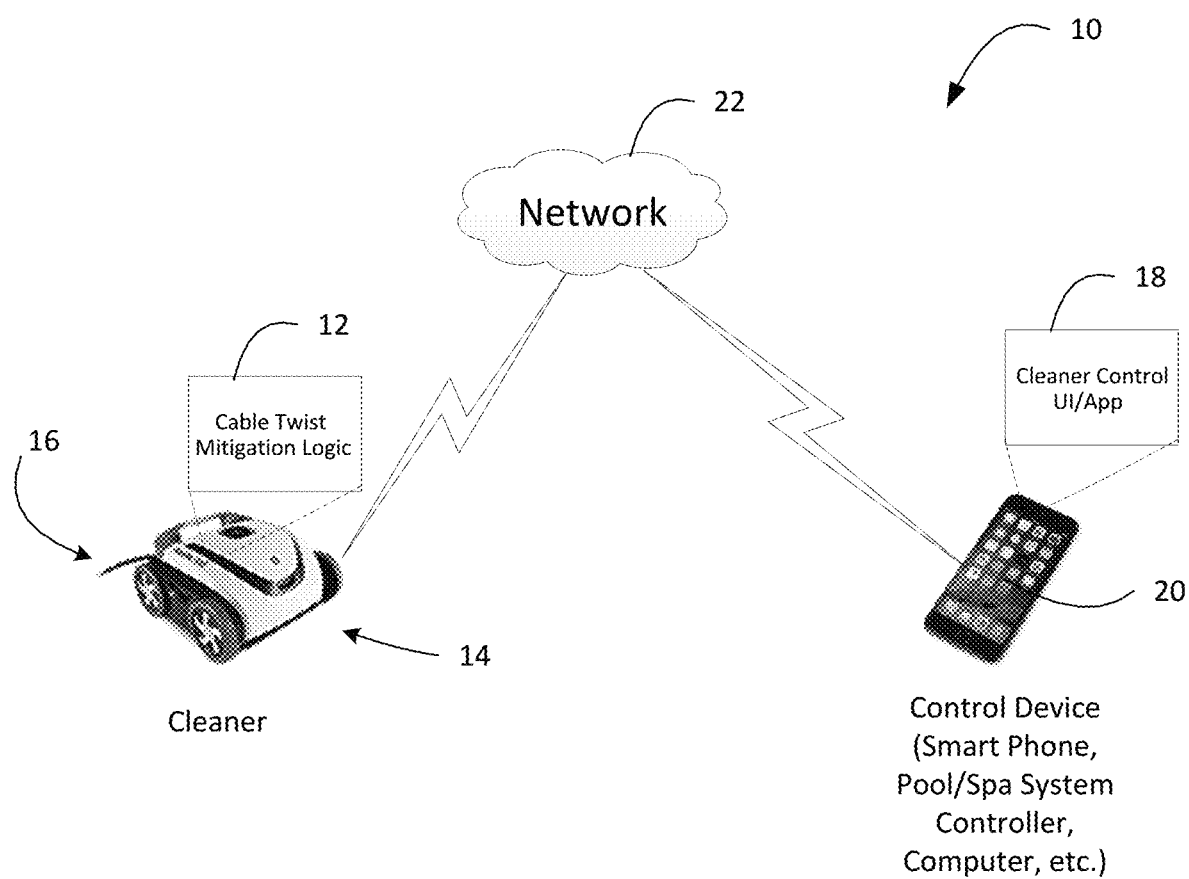
FIG. 1 is a diagram illustrating the system of the present disclosure.

FIG. 1 is a diagram illustrating the system of the present disclosure, indicated generally at 10. The system includes cable twist mitigation logic 12, embodied as computer-readable software instructions (e.g., firmware) stored in a computer-readable storage medium (e.g., a memory) of an underwater pool/spa cleaner 14 and executed by a processor (e.g., microprocessor) of the cleaner 14. As will be discussed in greater detail below, the cable twist mitigation logic 12, when executed by a processor of the cleaner 14, controls motion of the cleaner 14 so as to mitigate twisting of an electrical cable 16 supplying electrical power to the cleaner 14 when the cleaner 14 is in operation. Additionally, while the twist mitigation logic 12 is shown as part of the cleaner 14, it is noted that the logic 12 could be stored in and/or executed by another device in communication with the cleaner 14, such as a remote computer (e.g., server), smart phone, pool/spa control system, cloud computing platform, etc., without departing from the spirit or scope of the present disclosure.

Optionally, the cleaner 14 could communicate with a cleaner control software application 18 executing on a control device 20, such as a smart phone, a pool or spa system controller, a remote computer, etc., over a data communications network 22, so that the application 18 can remotely monitor and control one or more aspects of the cable twist mitigation logic 12, such as a user-definable bias value as will be discussed in greater detail below. The application 18 could present a graphical user interface (GUI) screen that allows the user to control the bias value and/or other aspects of the mitigation logic 12 and/or the cleaner 14. Such a GUI could include an appropriate GUI element, such as a slider adjustment bar or other suitable type of user interface control, for controlling the bias value or other aspect of the mitigation logic 12 and/or the cleaner 14. The network 22 could include, but is not limited to, one or more of a wired network (e.g., a local area network, a wide area network, or other suitable network) and/or a wireless network (e.g., WiFi, Bluetooth, Zigbee, etc.) as well as the Internet. Additionally, it is noted that the cable twist mitigation logic, including the bias adjustment described herein and any other related parameters, could be controlled using interfaces/controls other than a software application, such as control buttons (e.g., positioned on a power supply of the cleaner), hardware, or through other control inputs.

Figure 2:
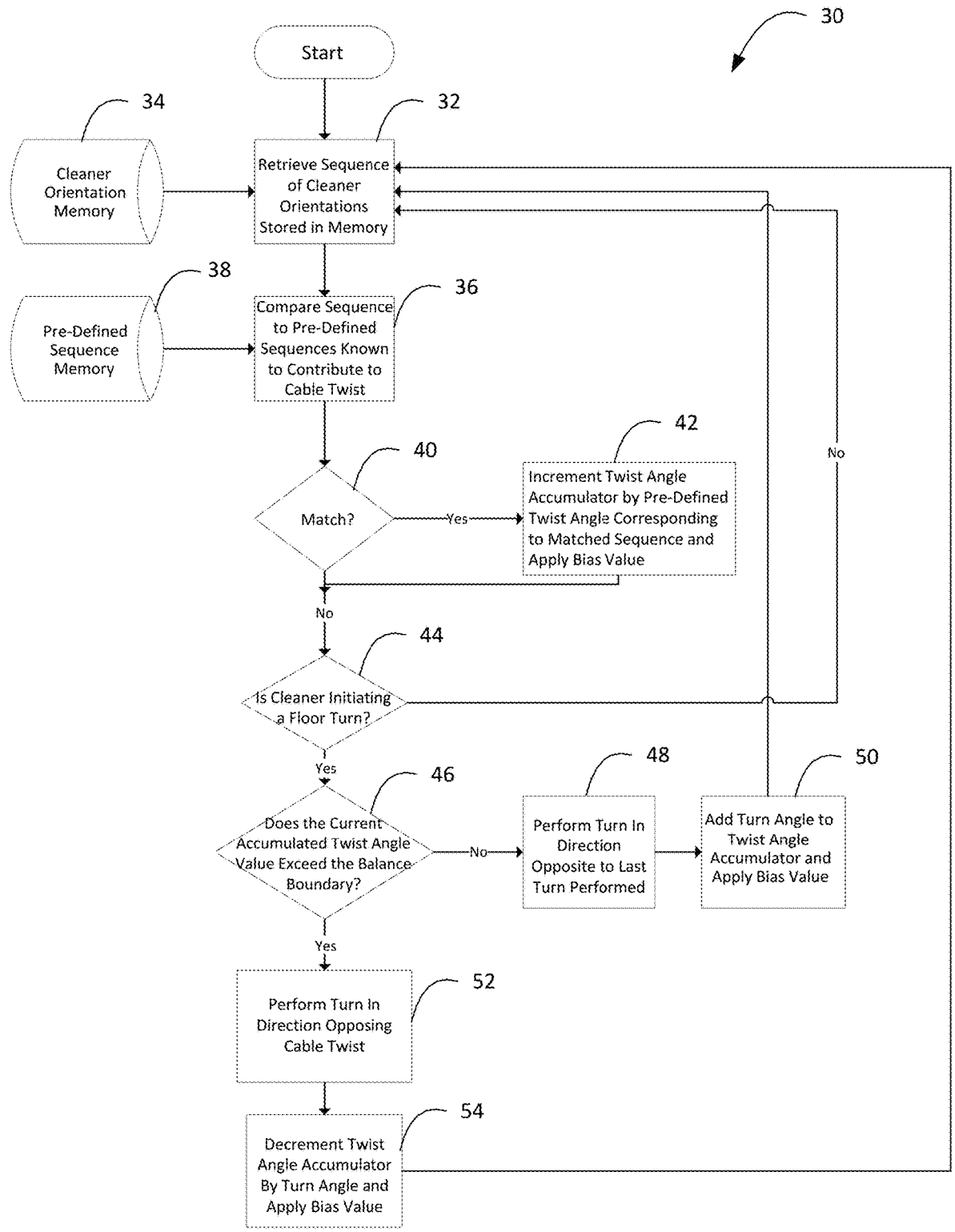
FIG. 2 is a flowchart illustrating steps in accordance with the present disclosure for mitigating cable twists for underwater cleaners.

FIG. 2 is a flowchart illustrating steps, indicated generally at 30, for mitigating cable twists for underwater cleaners. The process steps 30 could be carried out by the logic 12 executed by the cleaner 14. Beginning in step 32, the logic 12 retrieves a sequence of cleaner orientations (e.g., positions and/or movements) stored in a cleaner orientation memory 34, which could be stored in a memory of the cleaner 14 or remotely therefrom. The cleaner orientation memory 34 could include a table that stores positions and/or movements of the cleaner that are periodically sampled and stored in memory as the cleaner performs a cleaning cycle/operation. Preferably, in step 32, the last three orientations of the cleaner are retrieved from the memory 34, but any suitable number of sequences could be retrieved as desired. In step 36, the logic 12 compares the retrieved sequence to one or more pre-defined sequences stored in a pre-defined sequence memory 38 which are known to contribute to cable twist. The pre-defined sequence memory 38 could be stored in a memory of the cleaner 14 or remotely therefrom.

In step 40, the logic 12 determines whether the retrieved sequence of cleaner orientations (retrieved in step 32) matches one or more of the pre-defined sequences stored in the memory 38. If a match is determined to exist, step 42 occurs, wherein the logic 12 increments a twist angle accumulator by a pre-defined twist angle that corresponds to the matched sequence, and applies a stored biasing value. The pre-defined twist angle and the stored biasing value could each be expressed in angular degrees (e.g., the twist angle could be 45 degrees and the biasing value could be 30 degrees, but of course other values are possible). As will be described in greater detail below, the twist angle and the bias value are utilized to control turning of the cleaner 14 so as to counteract (mitigate) twisting of the cable 16 when the cleaner 14 is operating.

In step 44, the logic 12 determines whether the cleaner 14 is initiating a turn on an underwater surface, such as the floor of a pool or a spa. If a negative determination is made, control returns to step 32. Otherwise, step 46 occurs, wherein the logic 12 determines whether the current accumulated twist angle value exceeds a balance boundary. That is, in step 46, the logic 12 determines whether the accumulated twist angle value stored in the twist angle accumulator the cleaner exceeds the boundaries of a "zero-point" zone where the current twist accumulation is considered balanced. If a negative determination is made, step 48 occurs, wherein the logic 12 causes the cleaner 14 to perform a turn in a direction opposite the last turn performed by the cleaner 14. Then, in step 50, the logic 12 adds the turn angle to the twist angle accumulator and applies the stored bias value (by adding the bias value to the twist angle accumulator), and control returns to step 32. If a positive determination is made in step 46, step 52 occurs, wherein the logic 12 causes the cleaner 14 to perform a turn in a direction opposing cable twist. Every turn performed by the cleaner is done so with a randomized turn angle. Then, in step 54, the logic 12 decrements the angle accumulator by the turn angle performed in step 52 and applies the stored bias value (by adding the bias value to the twist angle accumulator), and control returns to step 32. It is noted that more than one iteration of the logic indicated by flowchart 30 could be carried out before the zero-point zone within the balance boundary is reached.

Figure 3:
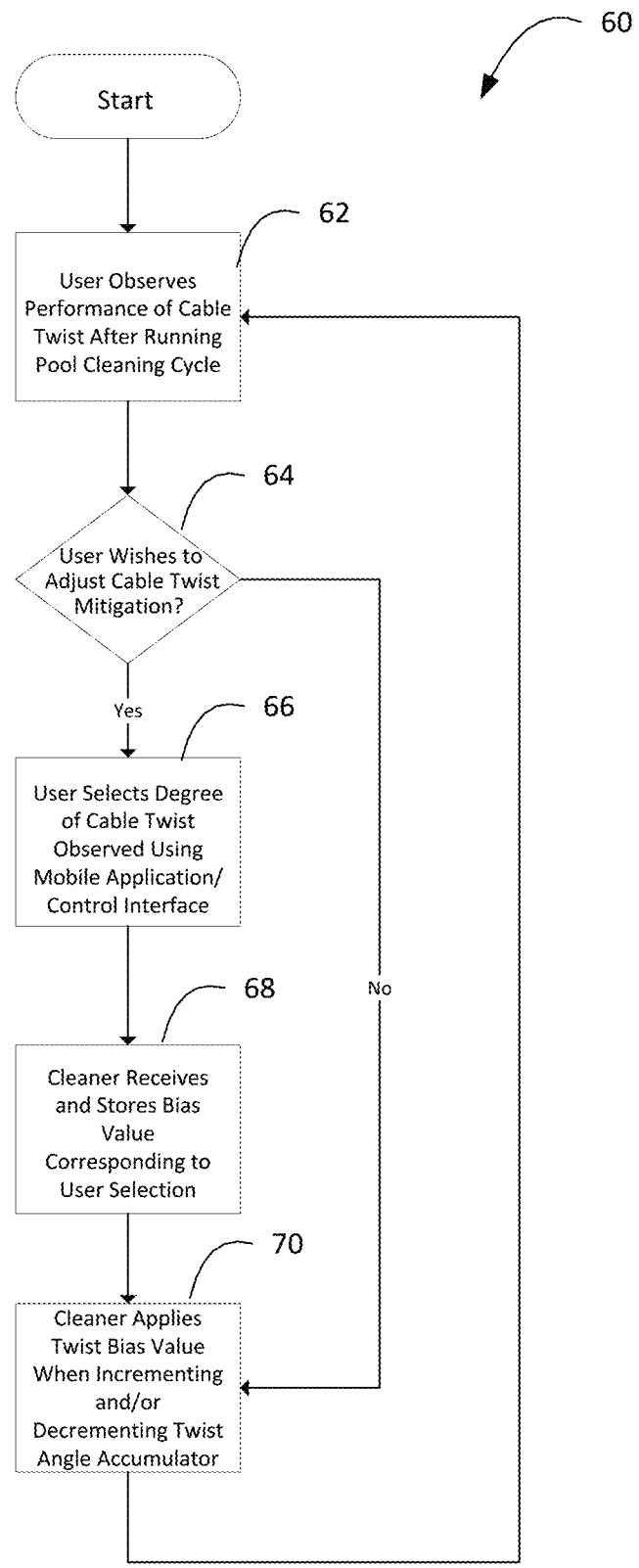
FIG. 3 is a flowchart illustrating steps in accordance with the present disclosure for adjusting a cable twist bias value.

FIG. 3 is a flowchart illustrating steps, indicated generally at 60, for adjusting a cable twist bias value. As noted earlier in connection with FIG. 1, a user can adjust the cable twist bias value to better accommodate the geometry of the user's pool or spa, thereby improving the ability of the system to mitigate cable twists. The steps 60 could be executed by the software application 18 executing on the device 20 of FIG. 1, or by another device in communication with the cleaner 14. In step 62, the user observes performance of the cable twist mitigation feature of the present disclosure after running a pool or spa cleaning cycle. In step 64, a determination is made as to whether the user wishes to adjust the cable twist mitigation feature. If a negative determination is made, step 70 occurs, wherein the cleaner 14 applies the twist bias value when incrementing and/or decrementing the twist angle accumulator. Otherwise, if a positive determination is made, step 66 occurs, wherein the user selects a degree of cable twist observed using one or more controls of the application 18. For example, the application 18 could allow the user to select a cable twist level indicated in levels of low twist, medium twist, or high twist by tapping on the twist level in the application 18. In step 68, the cleaner receives and stores a bias value corresponding to the user selection, and control then passes to step 70 described above. For example, if the cable twist level is low, the bias value could be set to 30 degrees; if the cable twist level is medium, the bias value could be set to 45 degrees; and if the cable twist level is high, the bias value could be set to 60 degrees. Of course, other values are possible without departing from the spirit or scope of the present disclosure.

Figure 4:
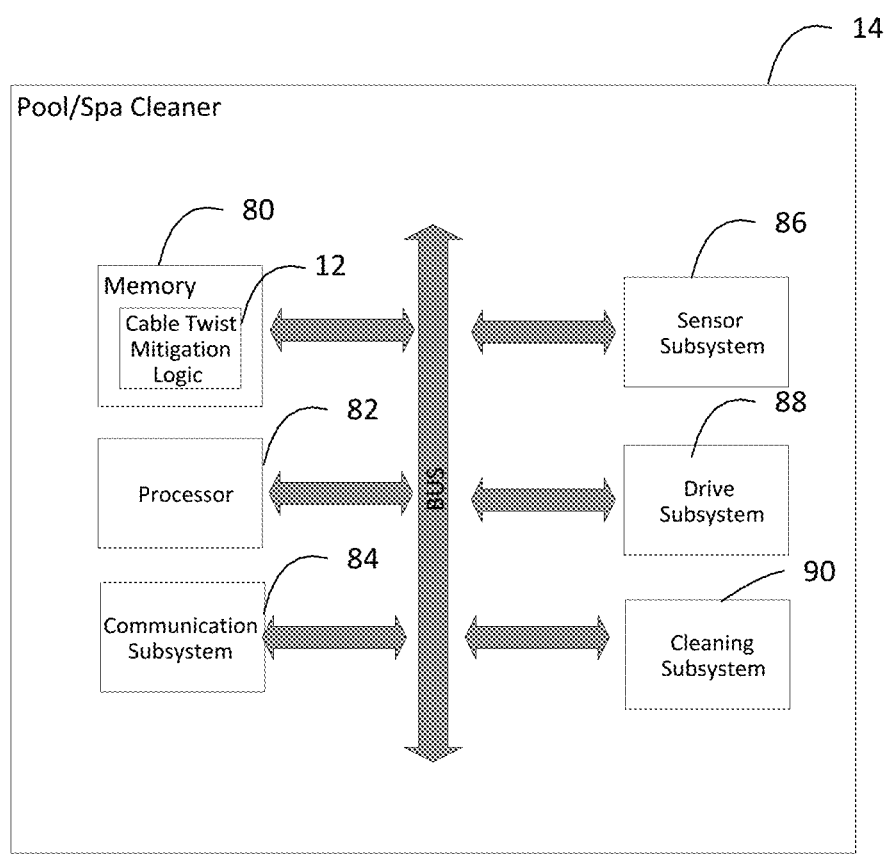
FIG. 4 is a diagram illustrating hardware and software components of an underwater cleaner in accordance with the present disclosure.

FIG. 4 is a diagram illustrating hardware and software components of the underwater cleaner 14 of FIG. 1. The cleaner 14 includes a memory 80 that stores the cable twist mitigation logic 12, a processor 82, a communication subsystem 84, a sensor subsystem 86, a drive subsystem 88, and cleaning subsystem 90. As shown, these components can communicate with each other via a bus. The memory 80 could be any suitable non-volatile memory such as flash memory, electrically-erasable, programmable, read-only memory (EEPROM), memory card, disk, or other suitable memory. The cable twist mitigation logic 12 is embodied as computer-readable instructions (e.g., firmware) stored in the memory 80. The processor 82 could be a microprocessor, microcontroller, field-programmable gate array (FPGA), or any other suitable device. The communication subsystem 84 allows for wired or wireless communication with a device external to the cleaner 14, such as the device 20 of FIG. 1. The sensor subsystem 86 includes one or more sensors for sensing one or more parameters of the cleaner 14, such as position, velocity, acceleration, etc., as well as associated processing/conditioning circuitry (e.g., analog-to-digital (ADC) converter circuitry, signal amplifiers, etc.). The drive subsystem 88 includes one or more motors and/or actuators and associated mechanical components (e.g., drive trains, gears, axles, wheels, etc.) for moving the cleaner 14 along an underwater surface. The cable twist mitigation logic 12 provides the functions described herein and controls operation of the drive subsystem 88 to control motion of the cleaner in accordance with the steps described herein so as to mitigate twisting of the cable 16. The cleaning subsystem 90 includes components for cleaning debris-laden surfaces of a pool or spa, including, but not limited to, fluid jets, brushes, pumps, filtration components, debris canisters, and/or other suitable components. All of the components shown in FIG. 4 could be housed by a suitable cleaner housing, such as the housing of the cleaner 14 shown in FIG. 1.

It is noted that the cable twist mitigation logic 12 disclosed herein could be extended to provide additional functionality. For example, the logic 12 could capture and store a "multi-run" history, such that the logic 12 tracks movements of the cleaner and associated cable twist bias values over multiple cleaning runs or cycles of the cleaner (e.g., over a period of days, weeks, or other time periods). Also, the logic 12 could allow a user (using, e.g., the user interface/app disclosed herein) to specify a setpoint corresponding to the user having just untwisted the cable, which could be processed by the logic 12 when calculating a cable twist bias value. Additionally, the logic 12 could provide a notification to a user (e.g., via the user interface and/or app disclosed herein) requesting that the user untwist the cable of a cleaner (e.g., when a threshold is exceeded). Still further, the logic 12 could include an artificial intelligence (AI) component that predicts an estimated degree of cable twisting like to occur (based on movements of the cleaner tracked/learned by the AI component over time), and initiate twist mitigation before such twists occur, in order to decrease the likelihood of future cable twists occurring.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A method for mitigating cable twists in an underwater cleaner, comprising the steps of:
   retrieving by a processor a sequence of cleaner orientations;
   comparing by the processor the sequence of cleaner operations to one or more pre-defined sequences known to contribute to cable twists;
   determining by the processor whether the sequence of cleaner orientations matches the one or more pre-defined sequences;
   incrementing by the processor a twist angle accumulator with a pre-defined twist angle corresponding to the one or more pre-defined sequences if the sequence of cleaner orientations matches the one or more pre-defined sequences;
   determining by the processor whether the cleaner initiates a turn on a surface of a pool or spa; and
   if the cleaner initiates a turn, controlling by the processor turning of the cleaner during the turn using the twist angle accumulator and adjusting the twist angle accumulator.

2. The method of claim 1, further comprising controlling by the processor turning of the cleaner during the turn using a bias value.

3. The method of claim 2, further comprising allowing a user to set the bias value.

4. The method of claim 1, further comprising determining by the processor whether a current twist angle accumulated in the twist angle accumulator exceeds a balance boundary and performing a turn in a direction opposing cable twist if the current twist angle accumulated in the twist angle accumulator exceeds the balance boundary.

5. The method of claim 1, further comprising storing by the processor movements of the cleaner over a plurality of cleaning cycles.

6. The method of claim 1, further comprising allowing the user to specify a setpoint corresponding to untwisting of the cable by a user.

7. The method of claim 1, further comprising processing by the processor movements of the cleaner using an artificial intelligence component to predict a degree of cable twisting likely to occur.

8. The method of claim 7, further comprising controlling by the processor turning of the cleaner in response to the predicted degree of cable twisting.

9. An underwater cleaner comprising:
   a drive subsystem, a processor, a memory, and a cable interconnecting the cleaner to an external power source; and
   cable twist mitigation logic stored in the memory and executed by the processor, the cable twist mitigation logic:
      retrieving a sequence of cleaner orientations;
      comparing the sequence of cleaner operations to one or more pre-defined sequences known to contribute to cable twists;
      determining whether the sequence of cleaner orientations matches the one or more pre-defined sequences;
      incrementing a twist angle accumulator with a pre-defined twist angle corresponding to the one or more pre-defined sequences if the sequence of cleaner orientations matches the one or more pre-defined sequences;
      determining whether the cleaner initiates a turn on a surface of a pool or spa; and
      if the cleaner initiates a turn, controlling turning of the cleaner during the turn using the twist angle accumulator and adjusting the twist angle accumulator.

10. The cleaner of claim 9, wherein the cable twist mitigation logic controls turning of the cleaner during the turn using a bias value.

11. The cleaner of claim 10, wherein the bias value can be set by a user.

12. The cleaner of claim 9, wherein the cable twist mitigation logic determines whether a current twist angle accumulated in the twist angle accumulator exceeds a balance boundary and performing a turn in a direction opposing cable twist if the current twist angle accumulated in the twist angle accumulator exceeds the balance boundary.

13. The cleaner of claim 9, wherein the cable twist mitigation logic stores movements of the cleaner over a plurality of cleaning cycles.

14. The cleaner of claim 9, wherein the cable twist mitigation logic allows the user to specify a setpoint corresponding to untwisting of the cable by a user.

15. The cleaner of claim 9, wherein the cable twist mitigation logic processes movements of the cleaner using an artificial intelligence component to predict a degree of cable twisting likely to occur.

16. The cleaner of claim 15, wherein the cable twist mitigation logic controls turning of the cleaner in response to the predicted degree of cable twisting.

17. An underwater cleaner comprising:
a drive subsystem, a processor, and a cable interconnecting the cleaner to an external power source; and
cable twist mitigation logic stored in a memory in communication with the processor, the cable twist mitigation logic:
retrieving a sequence of cleaner orientations;
comparing the sequence of cleaner operations to one or more pre-defined sequences known to contribute to cable twists;
determining whether the sequence of cleaner orientations matches the one or more pre-defined sequences;
incrementing a twist angle accumulator with a pre-defined twist angle corresponding to the one or more pre-defined sequences if the sequence of cleaner orientations matches the one or more pre-defined sequences;
determining whether the cleaner initiates a turn on a surface of a pool or spa; and
if the cleaner initiates a turn, controlling turning of the cleaner during the turn using the twist angle accumulator and adjusting the twist angle accumulator.

18. The cleaner of claim 17, wherein the cable twist mitigation logic controls turning of the cleaner during the turn using a bias value.

19. The cleaner of claim 18, wherein the bias value can be set by a user.

20. The cleaner of claim 17, wherein the cable twist mitigation logic determines whether a current twist angle accumulated in the twist angle accumulator exceeds a balance boundary and performing a turn in a direction opposing cable twist if the current twist angle accumulated in the twist angle accumulator exceeds the balance boundary.

21. The cleaner of claim 17, wherein the cable twist mitigation logic stores movements of the cleaner over a plurality of cleaning cycles.

22. The cleaner of claim 17, wherein the cable twist mitigation logic allows the user to specify a setpoint corresponding to untwisting of the cable by a user.

23. The cleaner of claim 17, wherein the cable twist mitigation logic processes movements of the cleaner using an artificial intelligence component to predict a degree of cable twisting likely to occur.

24. The cleaner of claim 23, wherein the cable twist mitigation logic controls turning of the cleaner in response to the predicted degree of cable twisting.

* * * * *